Oct. 26, 1937.  A. H. FRANK  2,097,368
CAN FEEDING MECHANISM
Filed Aug. 6, 1935
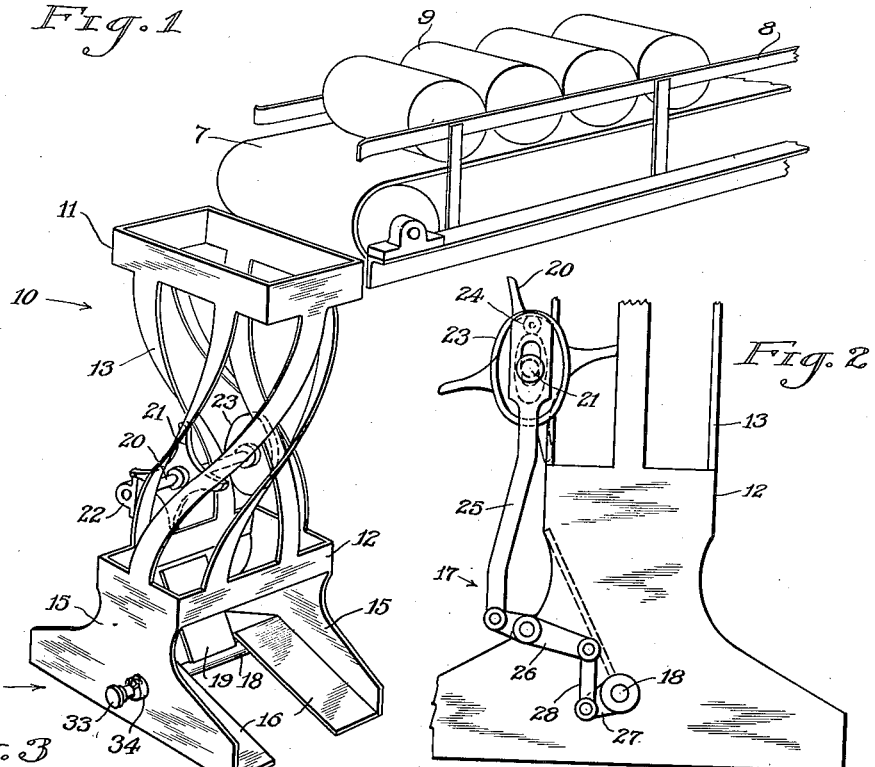
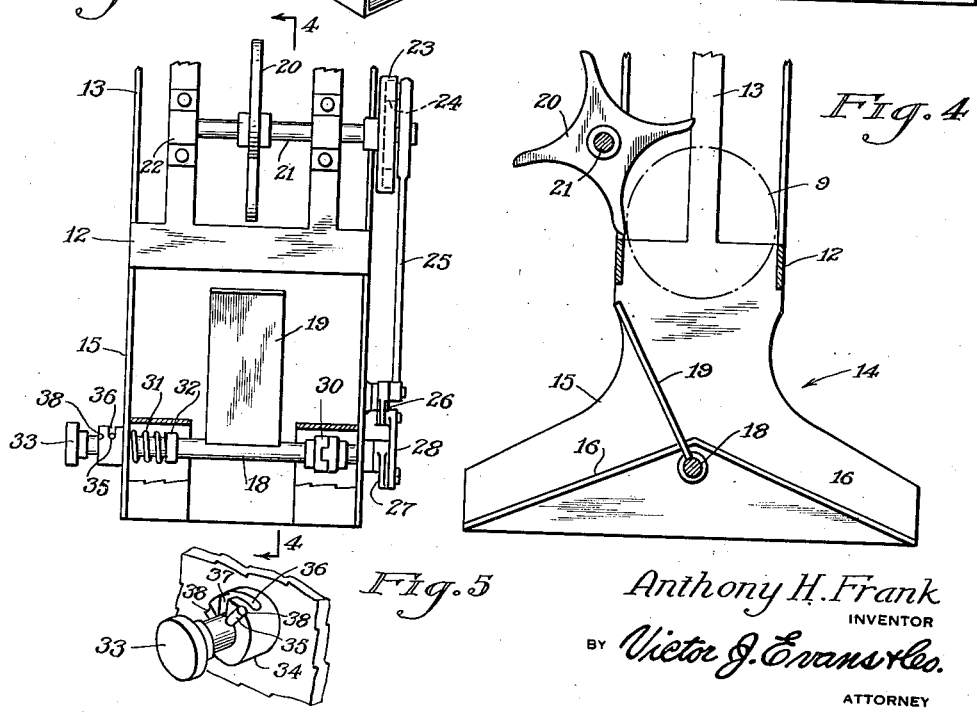
Anthony H. Frank
INVENTOR
BY Victor J. Evans & Co.
ATTORNEY Patented Oct. 26, 1937

2,097,368

UNITED STATES PATENT OFFICE 2,097,368

CAN FEEDING MECHANISM

Anthony H. Frank, Chicago, Ill.

Application August 6, 1935, Serial No. 34,955

5 Claims. (Cl. 193—31)

This invention relates to material handling equipment and more particularly to devices for delivering such articles as cans to two or more machines from a single conveyor.

The primary object of my invention is to provide an article conveying device which in operation will effect the delivery of the articles alternately to either side of the device from a single source of supply, the articles being delivered laterally from the direction of the supply.

A further object of my invention is to provide in a device of the character indicated a novel mechanism by which the articles being handled may be delivered to one side of the device only at the will of the operator.

My invention is adapted for use particularly in the canning industry, for example, the delivery of cans from a single conveying system to a pair of jointly operated labeling machines.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

In the drawing:

Fig. 1 is a general perspective view illustrating the application of my invention in a conveying system.

Fig. 2 is a front elevational view of the alternate delivery mechanism and chute.

Fig. 3 is a side elevational view of the device as shown in Fig. 2.

Fig. 4 is a vertical sectional view taken on line 4—4 of Fig. 3; and

Fig. 5 is a fragmentary perspective view of the clutch operating device.

As aforementioned, my device is intended for use in conjunction with a conveying system such, for example, as that shown in Fig. 1, which comprises a belt conveyor 7 equipped with guide rails 8 provided for the delivery of such articles as the cans 9. My alternate delivery device is suitably arranged at the discharge end of the conveyor system so that the cans 9 being discharged from same are deposited into my device.

One of the functions of my mechanism is to receive the cans from the conveyor system and deliver same laterally, that is to say, toward either side of the conveyor. The conveying of cylindrical articles, such as cans, is effected at intervals by rolling the can on its cylindrical side. It is therefore required that the can after being discharged from the conveyor be turned at right angles, during which the axis of the can is kept horizontal. To this end the function of the upper portion of my delivery device, hereinafter referred to as the twisting chute 10, is directed and comprises an upper collar 11 and a lower collar 12, both of which are joined by intermediate longitudinal bars 13. During fabrication of the twisting chute 10 the upper collar 11 and the lower collar 12 are disposed in registry with each other, the adjoining bars 13 being straight and parallel with each other. The upper collar 11 is then swung in a horizontal plane until its longitudinal axis is substantially at right angles to the longitudinal axis of the lower collar 12. From this it will be noted that the cans being discharged into the twisting chute 10 will be turned horizontally during passage thru the chute so that the axis of the can is turned substantially 90 degrees, thus permitting its discharge from the device laterally of the conveyor system.

The twisting chute 10 terminates in a base 14 which comprises parallel end plates 15 extending from the ends of the lower collar 12 and joined by the longitudinal sides of the latter. Projecting inwardly from the side plates 15 are pairs of inclined plates 16, each pair of plates being symmetrically disposed relative to the axis of the chute base 14 and oppositely inclined to each other so as to effect a discharge of the cans from same in a rolling action.

As aforementioned, my device functions to alternately deliver cans from either side of the chute, for which purpose the shunting mechanism 17 is provided, which comprises a pivotal shaft 18 journaled in the end plates 15 and carrying intermediate its ends a switching plate 19 projecting radially from same. The function of the plate 19 is to deflect or shunt a can coming in contact with same to cause the can to be discharged from one side of the chute. To effect the alternate delivery of the cans the plate 19 is swung to an inclined position at either side of the chute, being moved there coactively with the dropping of the cans thru the twisting chute 10 by the shunting mechanism 17. The latter comprises a star wheel 20 carried on a shaft 21 in bearings 22 fixed to the sides of the chute 10.

The star wheel 20 is provided with four prongs so disposed that one of the prongs projects into the chute 10 in the path of the can moving thru same, during which movement the star wheel is turned one quarter revolution. The star wheel shaft 21 projects beyond one side of the chute, at which end a suitably grooved cam 23 is affixed. The groove of the cam 23 is substantially oval in shape so that the cam roller 24 riding in same is caused to move alternately to and from the center of the cam with each quarter turn of same. The movement of the cam roller 24 is transmitted to the switching plate 19 thru the cam rod 25, which rod is slotted at its upper end by which to slidably support same on a projecting portion of the shaft 21, the cam roller 24 being rotatably mounted at the extreme upper end of the rod 25. To effect the further transmission of the motion, the lever 26 is pivotally mounted on one of the plates 15 and has its one end flexibly connected to the lower end of the cam rod 25. The shaft 18 projects thru the plate 15 at which end an arm 27 is affixed, the free end of the arm 27 being connected to the opposite end of the lever 26 by the link 28.

It will be seen from the foregoing that the intermittent turning of the star wheel 20 thru the mechanism 17 will cause the switching plate 19 to be disposed alternately at either side of the chute so that the cans arriving at the bottom of the chute are delivered alternately to either side thereof.

In the event that it be required that all of the cans be delivered out of one side of the chute it will be necessary to disconnect the switching plate 19 from the shunting mechanism 17 and to thereafter lock the plate 19 in either position, as desired. To effect this, the shaft 18 is constructed of two abutting sections, the same being joined by a jaw clutch 30, one of the sections of the shaft 18 extending into the opposite member of the clutch 30. A spring 31 pressing against a collar 32 on the shaft 18 urges the members of the clutch 30 into engagement. The shaft 18 extends also thru the opposite plate 15 at which end a knob 33 is secured, see Fig. 5. A collar 34 being rigidly carried on the plate 15 forms a journal for the shaft 18 and, being provided with a series of slots and recesses, functions as a lock to hold the switching plate 19 in either position in cooperation with a pin 35 which projects radially from the shaft 18.

A circumferential slot 36 extends partially around the collar 34 a distance ample to permit the free angular movement of the pin 35 therein during the oscillation of the switching plate 19. From the slot 36 extends a longitudinal slot 37 thru which the pin 35 may be drawn to be engaged on the end surface of the collar 34, at which surface a pair of radial recesses or grooves 38 is cut, the respective grooves being equally spaced from the slot 37 and adapted to receive the pin 35 to lock the switching plate 19 in either position.

The functioning of this feature of my device is as follows, assuming that the clutch 30 is engaged and that the shunting mechanism 17 is operating to oscillate the plate 19. When it is required to lock the plate 19 in either position, the shaft 18 is moved axially against the pressure of the spring 31 by moving the knob 33 so that the pin 35 is drawn out of slot 36 thru slot 37 to be engaged in the desired groove 38 into which groove the pin 35 is urged by the pressure of spring 31. With the pin 35 engaged in one of the grooves 38 the members of the clutch 30 are consequently disengaged and the shunting mechanism 17 continues to operate without effect on the switching plate 19.

What is claimed as new is:

1. In mechanism of the character described, a chute adapted to receive cans, exit passageways extending from the discharge end of said chute, and means operated by the passage of cans thru the chute for successively closing and opening one of said passageways and opening and closing the other, whereby successive cans are constrained to enter different passageways, said means comprising a pivoted switching plate, a star wheel in said chute and adapted to be turned by passage of the cans thru the chute and transmission mechanism adapted to transmit motion from said wheel to said plate.

2. In mechanism of the character described, a chute adapted to receive cans, exit passageways extending from the discharge end of said chute, and means operated by the passage of cans thru the chute for successively closing and opening one of said passageways and opening and closing the other, whereby successive cans are constrained to enter different passageways, said means comprising a pivoted switching plate, a star wheel in said chute and adapted to be turned by passage of the cans thru the chute and transmission mechanism adapted to transmit motion from said wheel to said plate, and means for rendering said transmission mechanism ineffective.

3. In a can separating device, a can guide terminating in branches, movably mounted means at the juncture of the branches to alternately deflect cans to the branches, a rotatably mounted shaft for supporting said means, a can actuated element located above the juncture of the branches for shifting said first named means, an operating connection between said can actuated element and said shaft, said shaft comprising two parts, and clutch means for disconnecting the shaft for rendering said first named means incapable of shifting to alternative positions.

4. In a can separating device, a can guide terminating in branches, movably mounted means at the juncture of the branches to alternately deflect cans to the branches, a rotatably mounted shaft for supporting said means, a can actuated element located above the juncture of the branches for shifting said first named means, an operating connection between said can actuated element and said shaft, said shaft comprising two parts, clutch means for disconnecting the shaft for rendering said first named means incapable of shifting to alternative position, and means for latching a part of said shaft in shifted position, to disconnect the clutch.

5. In a can separating device, a can guide terminating in branches, movably mounted means at the juncture of the branches to alternately deflect cans to the branches, a can actuated element movably mounted above the said means, to be operated by cans moving through the device, an operating connection between said can actuated element and said means, and means for disconnecting said connection, to hold said means in a selected position for directing all the cans to either of the branches.

ANTHONY H. FRANK.